United States Patent

Kopylov et al.

[11] Patent Number: 5,858,052
[45] Date of Patent: Jan. 12, 1999

[54] MANUFACTURE OF FLUORIDE GLASS FIBERS WITH PHOSPHATE COATINGS

[75] Inventors: Nonna Kopylov, Scoth Plains; Ahmet Refik Kortan, Warren, both of N.J.

[73] Assignee: Lucent Technologies Inc., Murray Hill, N.J.

[21] Appl. No.: 934,375

[22] Filed: Sep. 19, 1997

[51] Int. Cl.$^6$ .......................... C03C 17/00; C03C 25/02; C03B 9/00; C03B 11/00

[52] U.S. Cl. .................. 65/388; 65/60.53; 65/66; 65/404; 65/430; 501/37; 501/40; 501/904

[58] Field of Search ................ 65/60.53, 66, 384, 65/388, 404, 430, DIG. 16; 501/37, 40, 904

[56] References Cited

U.S. PATENT DOCUMENTS

| | | | |
|---|---|---|---|
| 4,883,339 | 11/1989 | Vacha et al. | 65/388 |
| 4,938,562 | 7/1990 | Vacha et al. | 65/388 |
| 5,285,518 | 2/1994 | Elyamani et al. | 501/37 |

OTHER PUBLICATIONS

Y.B. Peng, D.E. Day, "High thermal expansion phosphate glasses" Glass Technology, vol. 32, p. 166, Oct. 1991.

*Primary Examiner*—Peter Chin
*Assistant Examiner*—Jacqueline A. Ruller

[57] ABSTRACT

The specification describes a method for the manufacture of fluoride glass optical fibers which are covered with a protective coating of phosphate glass. The coating is produced by dipping the fluoride glass preform in a phosphate glass melt prior to drawing the optical fiber. The fluoride glass is ZBLAN. The phosphate glass has a glass transition temperature below 200° C., which allows the dipping step to be carried out at a relatively low temperature where the preform temperature is maintained well below the crystallization temperature of the fluoride glass, and also where the viscosity of the fluoride glass preform is substantially higher than the viscosity of the phosphate glass coating material.

9 Claims, 4 Drawing Sheets

MANUFACTURE OF FLUORIDE GLASS FIBERS WITH PHOSPHATE COATINGS

FIELD OF THE INVENTION

This invention relates to the manufacture of heavy metal fluoride glass fibers.

BACKGROUND OF THE INVENTION

The potential of fluoride glass fibers for ultra low loss applications, particularly in long wavelength, i.e. infra-red systems, has been recognized for some time. Potential applications include low loss optical communication systems in which repeaters can be essentially eliminated for many long distance links. The theoretical loss of these materials due to intrinsic Rayleigh scattering and the multiphonon absorption edge loss is 0.001 dB/km at 2.5 $\mu$m and should allow a repeaterless communications link of several thousand kilometers. Other photonic device applications include optical fiber amplifiers, filters, upconversion devices, multiplexers, etc. Other industrial applications include diagnostic and surgical tools in medicine, power transmission, high temperature sensing equipment, high power lasers, all of which may require low loss, long wavelength light transmission for which these fibers are especially suited.

The commercial potential of fluoride fibers has not been realized to date due to their poor chemical durability and low mechanical strength. Defects on drawn fiber surfaces can occur from chemical imperfections and impurities. Moreover, fluoride glasses are inherently soft, and slight mechanical imperfections from drawing and coating are largely unavoidable. While small surface defects in silica glass fibers occur routinely, these are essentially benign when coated with conventional polymer materials. By contrast, small surface defects in fluoride glass fibers grow in spite of conventional polymer coatings under most ambient conditions, especially under humid conditions. Moreover, the heavy metal fluoride glasses, i.e. zirconium fluoride glasses, have poor chemical stability especially in the presence of water, forming zirconium hydroxide crystallites on exposed surfaces. These crystallite formations on the surface produce crack initiation sites on the glass surface and drastically reduce fiber strength, typically from 250 ksi to a few tens of ksi.

The extreme moisture sensitivity of these fibers has been addressed by many workers using a variety of hermetic coating materials which so far have proved relatively ineffective in producing high strength fibers.

Coatings applied to the as drawn fiber present difficult materials and process engineering problems, although a wide variety of such techniques have been attempted. See e.g., G. A. Al-Jumaily et al, *Mater. Sci. Forum* Vol. 6, p. 721, (1985); P. C. Schultz et al , *Mater. Sci. Forum* Vols. 19–20, pp. 419–430, (1987).

More promising, are bulk glass coatings applied to the fluoride glass preform prior to drawing. This allows the use of more or less conventional fiber manufacture techniques and equipment. These techniques have been moderately successful, producing losses of the order of 0.5 dB/km, which makes many short length fiber device applications feasible. In particular, these glasses are now recognized as ideal host materials for many near-IR active fiber device applications because of their long-wavelength multiphonon absorption edges.

In most cases the heavy metal fluoride glasses are so-called ZBLAN glass or modifications thereof. ZBLAN is an acronym for a mixed glass of fluorides of zirconium, barium, lanthanum, aluminum and sodium and has been the material of choice in many of the investigations in the development of fluoride optical fibers. ZHBLAN is an acronym for a mixed glass of fluorides that has hafnium in addiction to the components of the ZBLAN glasses.

Schultz et al used ZBLAN glasses and experimented with various inorganic oxide, nitride, and carbide protective coatings using RF-sputter coating. They identified MgO as a good candidate for an effective moisture barrier, but reported no results on actual fibers. See P. C. Schultz, L. J. B. Vacha, C. T. Moynihan, B. B. Harbison, K. Cadien, R. Mossadegh, "Hermetic coatings for bulk fluoride glasses and fibers", Materials Science Forum, Vol. 19–20 19–20, pp. 343–352 (1987). Buhler et al have reported good bulk glass protection on ZBLA glass (ZBLAN glass without sodium fluoride) using e-beam evaporated $SiO_2$ and $Ta_2O_5$ films. See M. Buhler, J. Edinger, H. K. Pulker, M. Reinhold, B. Bendow, O. El-Bayoumi, "Optical and protective coatings for heavy-metal fluoride glasses prepared by reactive ion plating", Materials Science Forum, Vols. 19–20, pp. 353–362 (1987). However, a large thermal expansion coefficient differences exists between these coating materials and ZBLAN, which prohibits their use as bulk coating materials on optical fiber preforms. Vacha et al have developed a phosphate glass overcladding for preforms that has a glass transition temperature of 247° C. and a thermal expansion coefficient of $17.4 \times^{-6}/°$ C. They used the rotational casting method to make phosphate tubes, and sequentially poured the molten glasses for the clad and core into a rotating cylindrical mold to produce the multimode optical fiber preform. The use of this overclad enhanced the fracture strength significantly. See L. J. B. Vacha, P. C. Schultz, C. T. Moynihan, S. N. Crichton, "Flox fibers: fluoride glasses with oxide overclad, Materials Science Forum, Vols. 19–20, pp. 419–430 (1987). Orcel et al have studied various metal oxides in phosphate glasses and developed a chemically durable phosphate glass suitable for fluoride glass protection. See G. Orcel, D. Biswas, M. R. Shahriari, T. Iqbal, G. H. Sigel, "Development of a new glass for fluoride fiber overclad", Materials Science Forum, Vol. 67, pp. 569–574 (1991). Phosphate glasses in general have been studied in great detail. See e.g. N. H. Ray, C. J. Lewis, J. N. C. Laycock, W. D. Robinson, "Oxide glasses of very low softening point. Part 1,2 Preparation and properties of some lead phosphate glasses", Glass Technology, Vol. 14, pp. 50–59 (1973); B. C. Sales, L. A. Boatner, "Optical, structural, and chemical characteristics of lead-indium phosphate and lead-scandium phosphate glasses", J. Amer. Ceram. Soc., Vol. 70, pp. 615–621 (1987); Y. B. Peng, D. E. Day, "High thermal expansion phosphate glasses", Glass Technology, Vol. 32, p. 166 (1991). These glasses have low softening and melting temperatures, good temperature durability, and good mechanical properties. They also have a large coefficient of thermal expansion, and were originally developed for sealing metal leads. The temperature dependence of their viscosity is similar to silicate glasses and not nearly as steep as the fluorozirconate glasses. Glass materials in this category have base compositions of 50–70 mol % $P_2O_5$, 10–30 mol % PbO, and 10–20 mol % of oxides of Li,K, and Na. Alkaline earth oxides, MgO, BaO and CaO, and metal oxides like CdO and $V_2O_5$ are added to improve durability and decrease the water solubility.

In a recent study, Hartmann et al have used a phosphate glass with a 227° C. glass transition to overclad ZBLAN optical fiber preforms. See M. Hartmann, G. H. Frischat, K. Hogerl, G. F. West, "Resistant oxide coatings for heavy metal fluoride glasses", Journal of Non-Crystalline Solids, Vol. 184, pp. 209–212 (1995). They coated the preforms using a dip coating process using a melt at 500° C. and observed crystallization at the fluoride glass-phosphate glass interface. On decreasing the melt temperature to 350°–370° C. they obtained a good transparent coating. The phosphate glasses they used have high melting temperatures and therefore do not allow lower temperatures for dip-coating. The work of Hartmann et al focuses on the temperature regime above the crossover point in the viscosity vs. temperature plot of the fluoride and phosphate glasses (see FIG. 3 of Hartmann et al). At the dip-coating temperatures used by Hartmann et al the viscosity of the fluoride glass being coated is very low and significant crystallization results.

STATEMENT OF THE INVENTION

We have developed a phosphate-based glass suitable for a low temperature coating application, and a dip method to apply it on the optical fiber preform, that does not induce crystallization. The compositions have glass transition temperatures below 200° C. which allows the use of dip temperatures in the temperature regime below the crossover point in the viscosity vs. temperature profile. In this temperature range the viscosity of the fluoride glass is above the viscosity of the phosphate glass and surface softening and crystallization of the fluoride glass is prevented. With these compositions the crossover point where the viscosity of the fluoride and phosphate glass are essentially equal occurs at a viscosity and temperature desirable for drawing the fiber. Moreover, the coefficient of thermal expansion for the overclad essentially matches that for the fluoride fiber preform.

DETAILED DESCRIPTION

The phosphate glass compositions used for overcladding fluoride optical fiber preforms according to the invention are given in the following Table.

TABLE I

| Sample | Wt (gr) | $P_2O_5$ | PbO | $Na_2O$ | MgO | BaO | $V_2O_5$ | CaO | $KO_2$ |
|---|---|---|---|---|---|---|---|---|---|
| 1 | 25 | 60 | 26.1 | 0 | 1.3 | 1.3 | 1.3 | 0 | 10 |
| 2 | 70 | 60 | 26.1 | 0 | 1.3 | 1.3 | 1.3 | 0 | 10 |
| 3 | 25 | 68.4 | 10 | 18 | 1.2 | 1.2 | 1.2 | 0 | 0 |
| 4 | 50 | 66 | 12 | 18 | 1.2 | 1.2 | 1.2 | 0 | 0 |

TABLE I-continued

| Sample | Wt (gr) | $P_2O_5$ | PbO | $Na_2O$ | MgO | BaO | $V_2O_5$ | CaO | $KO_2$ |
|---|---|---|---|---|---|---|---|---|---|
| 5 | 100 | 66 | 12 | 18 | 1.2 | 1.2 | 0.4 | 1.2 | 0 |
| 6 | 25 | 66 | 12 | 18 | 1.2 | 1.2 | 0.4 | 1.2 | 0 |
| 7 | 100 | 64 | 14 | 18 | 1.2 | 1.2 | 0.4 | 1.2 | 0 |
| 8 | 200 | 65 | 15 | 16 | 1.2 | 1.2 | 0.4 | 1.2 | 0 |
| 9 | 70 | 63 | 17 | 16 | 1.2 | 1.2 | 0.4 | 1.2 | 0 |
| 10 | 209 | 63 | 17 | 16 | 1.2 | 1.2 | 0.4 | 1.2 | 0 |
| 11 | 200 | 63 | 17 | 16 | 1.2 | 1.2 | 0.4 | 1.2 | 0 |

These compositions have phosphate contents in the range 60–70 mol % and glass transition temperatures in the range 180° C. to 200° C. They also have thermal expansion coefficients that essentially match the thermal expansion coefficients of ZBLAN glass. Generically defined, these phosphate glasses are made with glass batches or melts that comprise (in mol %):

$H_3PO_4$—60–70%

PbO—8–30%

$Na_2O$ or $K_2O$ or mixtures thereof—6–30%

MgO—0.5–3.0%

BaO—0.5–3.0%

$V_2O_5$—0.5–3.0%

CaO—0–3.0%

The fluoride glass compositions are mixtures including at least one heavy metal fluoride. Typical specific compositions in mol % of ZBLAN or ZHBLAN glass suitable for fluoride optical fibers are:

$53ZrF_4$-$20BaF_2$-$4LaF_3$-$3AlF_3$-$20NaF$ $55HfF_4$-$16BaF_2$-$3LaF_3$-$2.5AlF_3$-$22NaF$ $33ZrF_4$-$20HF_4$-$18BaF_2$-$4LaF_4$-$3AlF_3$-$22NaF$ $55ZrF_4$-$28BaF_2$-$4LaF_3$-$3AlF_3$-$10NaF$ $56ZrF_4$-$14BaF_2$-$6LaF_3$-$4AlF_3$-$20NaF$ $53HfF_4$-$20BaF_2$-$4LaF_3$-$3AlF_3$-$20NaF$ $26.5HfF_4$-$26.5ZrF_4$-$20BaF_2$-$4LaF_3$-$3AlF_3$-$20NaF$

The generic description for this category of fluoride glass in terms of composition by mol % is:

50–60% of a fluoride selected from the group consisting of zirconium fluoride, hafnium fluoride and mixtures thereof 10–25% barium fluoride 3–7% lanthanum fluoride 2–5% aluminum fluoride 5–25% sodium fluoride These fluorides are mixed thoroughly and cast into cylindrical bodies in e.g. a brass mold. The cast bodies are then annealed near the transition temperature of the glass, typically 260°–270° C., and cooled to room temperature.

Figure 1:
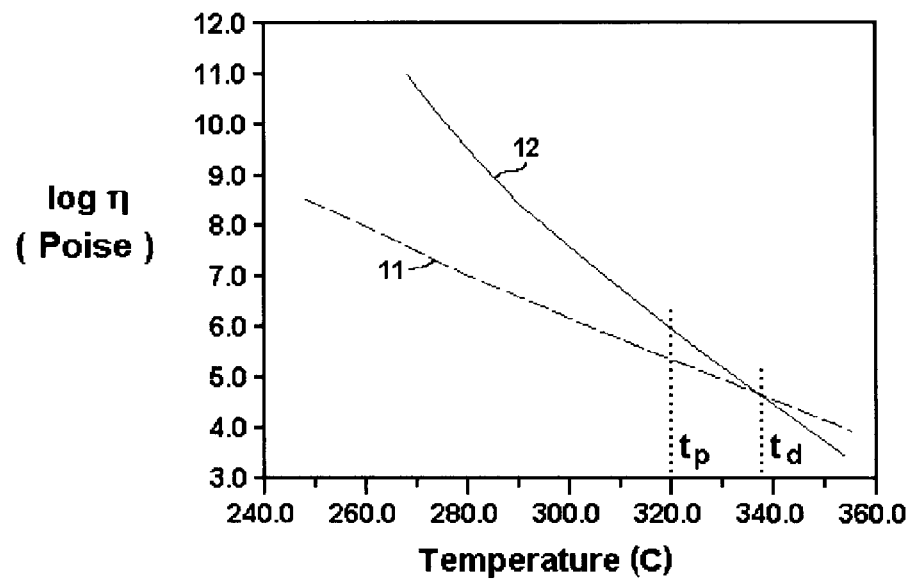
FIG. 1 is a plot of viscosity as ordinate vs. temperature as abscissa comparing the viscosity vs temperature profiles for ZBLAN glasses and the phosphate overcladding materials of the invention.

In the manufacture of optical fibers, an important property of the glasses in the preform, and the overclad glasses, is the glass viscosity. Referring to FIG. 1, the temperature dependence of viscosity is shown for ZBLAN glass and for the phosphate glass overcladding materials of the invention. The viscosity measurement is plotted as log η in Poise as ordinate and temperature in degrees Celsius as abscissa. Curve 11 is the curve for the phosphate glass and curve 12 for the fluoride glass. As seen the viscosity of the fluoride glass has a steep temperature dependence, and the crossover point where the viscosities match is approximately 335° C., and is the ideal draw temperature $T_D$. Below 335° C., the viscosity of these chosen phosphate glasses is less than the viscosity of the fluoride glass and the difference rapidly diverges to a temperature $T_p$ near 320° C. for example, where the viscosities differ by more than an order of magnitude and is a desirable dip coating temperature. The dip coating method of the invention comprises the following steps:

1. The fluoride glass preform to be coated is mechanically polished, chemically etched by an $NH_4HF_2$ solution, and transferred into a controlled atmosphere container with a humidity level below 1 ppm $H_2O$.

2. The preform is then placed in a furnace at a temperature in the range 215°–255° C., i.e. near the $T_g$ of the fluoride glass ( approximately 265° C.), but preferably 10°–50° C. under the $T_g$.

3. The phosphate glass is prepared in a Pt crucible by melting it at high temperatures (800°–1000° C.) in a moisture free in-situ furnace, and soaking the glass for a few hours at a temperature above the liquidus (approximately 700° C.) to eliminate air bubbles.

4. The phosphate glass is removed from the furnace and is allowed to free cool in the Pt crucible to a temperature in the range 300°–350° C.

5. The fluoride glass preform is removed from the furnace, dipped into the viscous phosphate glass, and immediately removed. Dipping time, i.e. the residence time of the preform in the phosphate glass melt, is typically approximately 2 seconds and is preferably less than 10 seconds.

Figure 2:
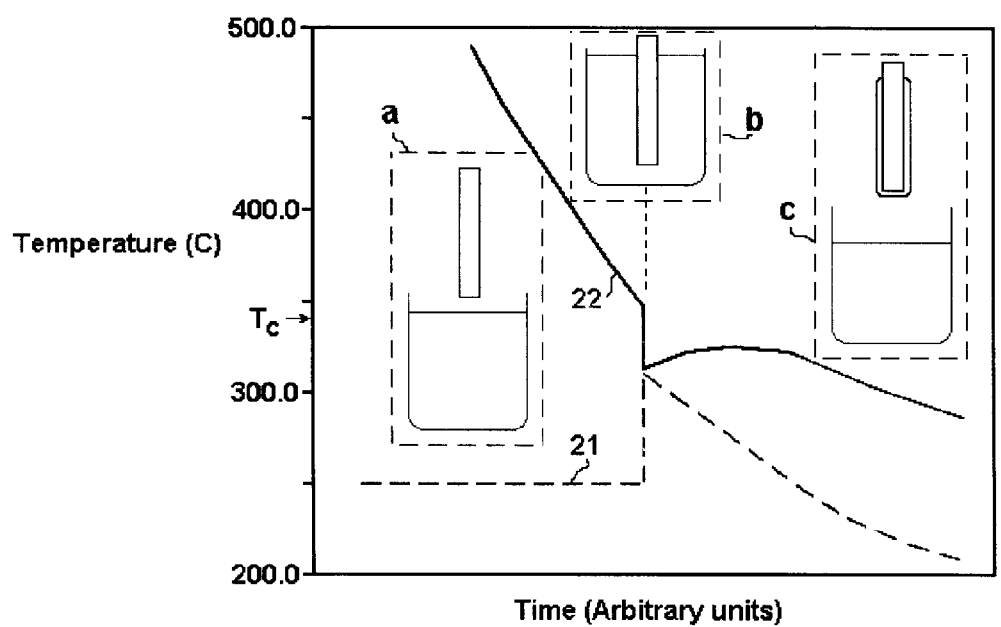
FIG. 2 is a plot of temperature as ordinate vs. time as abscissa to represent the thermal history of the ZBLAN glass and the phosphate overclad during the dipping process of the invention.

The thickness of the phosphate glass overclad can be adjusted by changing the temperature of the phosphate molten glass. A high temperature phosphate melt temperature applies a thin overclad and a lower temperature phosphate melt results in a thicker overclad. This dipping procedure leaves a smooth, uniformly thick, coating on the preform. The coated preform is then placed in a furnace and annealed through the $T_3$'s of the fluoride and phosphate glasses sequentially. The temperature variation (° C.)of the preform and the coating glass during the process (time in arbitrary units) is shown in FIG. 2. Dashed curve 21 gives the temperature history for the fluoride glass preform, and curve 22 gives the temperature history for the phosphate glass melt. The stages of the process, i.e. pre-dip, dip, and post-dip are represented by diagrams a–c. As seen, at the instant of dip, the melt temperature quenches somewhat and the fluoride glass temperature rapidly rises. However, at no time in the process does the temperature of the preform approach $T_c$, or 345°0 C., the crystallization temperature of the glass. Using the technique as described the temperature of the preform is easily and routinely kept at least 10° C. below the crystallization temperature $T_c$, i.e. below 335° C., and preferably below 325° C. Although the fluoride preform temperature undergoes a rapid rise, there is little thermal shock to the preform glass since the temperature change occurs above the glass softening temperature. After dipping, the fluoride-phosphate glass interface equilibrates in the temperature range 260°–320° C., and at this point the coated preform is cooled to the glass transition temperatures of the fluoride and phosphate glasses sequentially, and is annealed at each of the two glass transition temperatures to relieve residual strains in the glass before cooling to room temperature.

The fluoride-phosphate interface remains sharp due to the large difference in viscosities that is maintained during the coating process. In the process described the difference is of the order of a factor of ten . The important features of the process are: performing the dip step at a temperature below the crossover point in the preform-overclad viscosity profiles, and using an overclad glass material that has a glass transition temperature well below, i.e. at least 60 degrees Celsius, below the glass transition temperature of the fluoride glass preform. As will be appreciated from the log plot of FIG. 1, a temperature below the crossover point in the viscosity-temperature profiles easily produces a large difference in viscosities. In the context of the invention the viscosity of the fluoride glass at the dipping temperature is preferably at least 1.5 times the viscosity of the phosphate glass overclad material.

Figure 3:
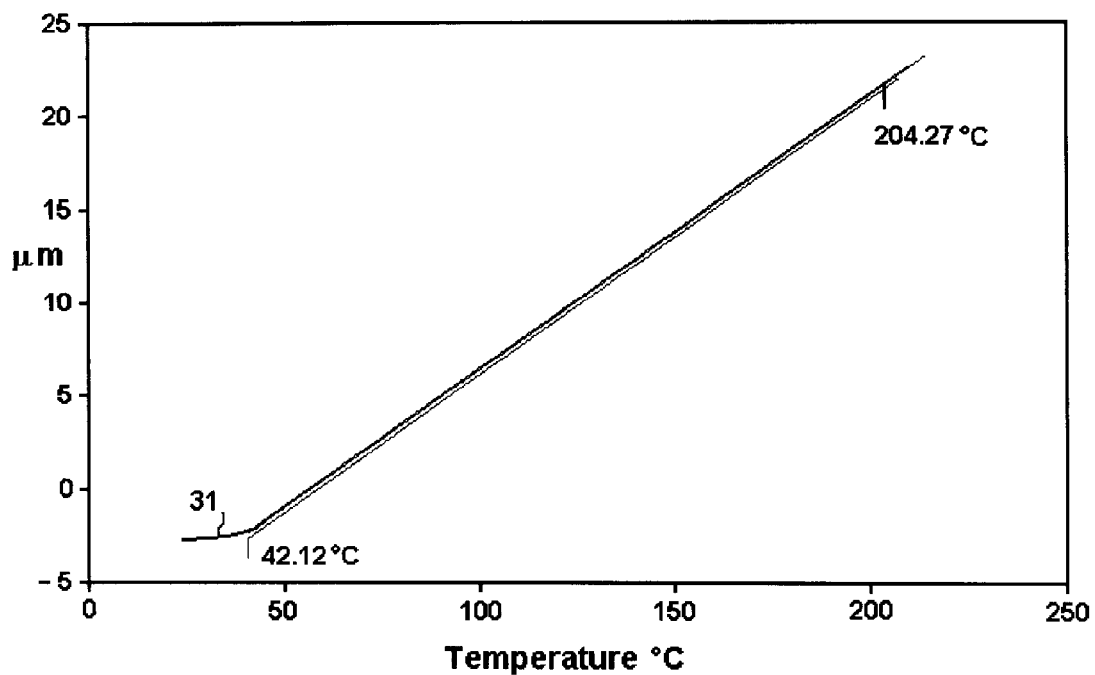
FIGS. 3–5 are plots of dimensional change vs. temperature for three samples phosphate glass compositions showing a range of possible thermal expansion coefficients to match the thermal expansion properties of the fluoride glass.
Figure 4:
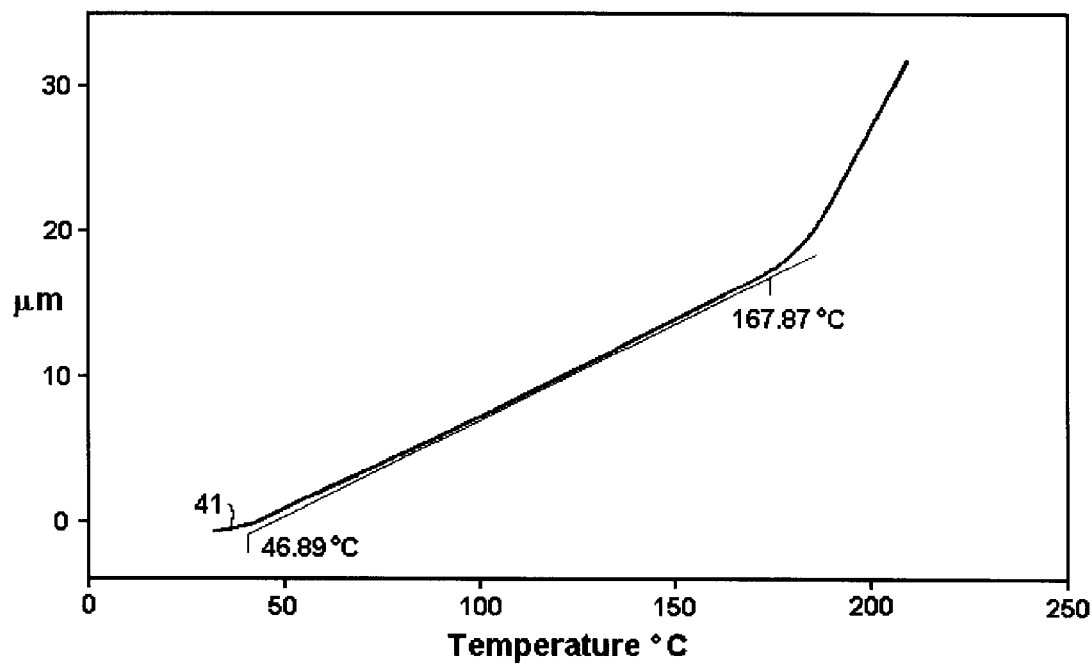
Figure 5:
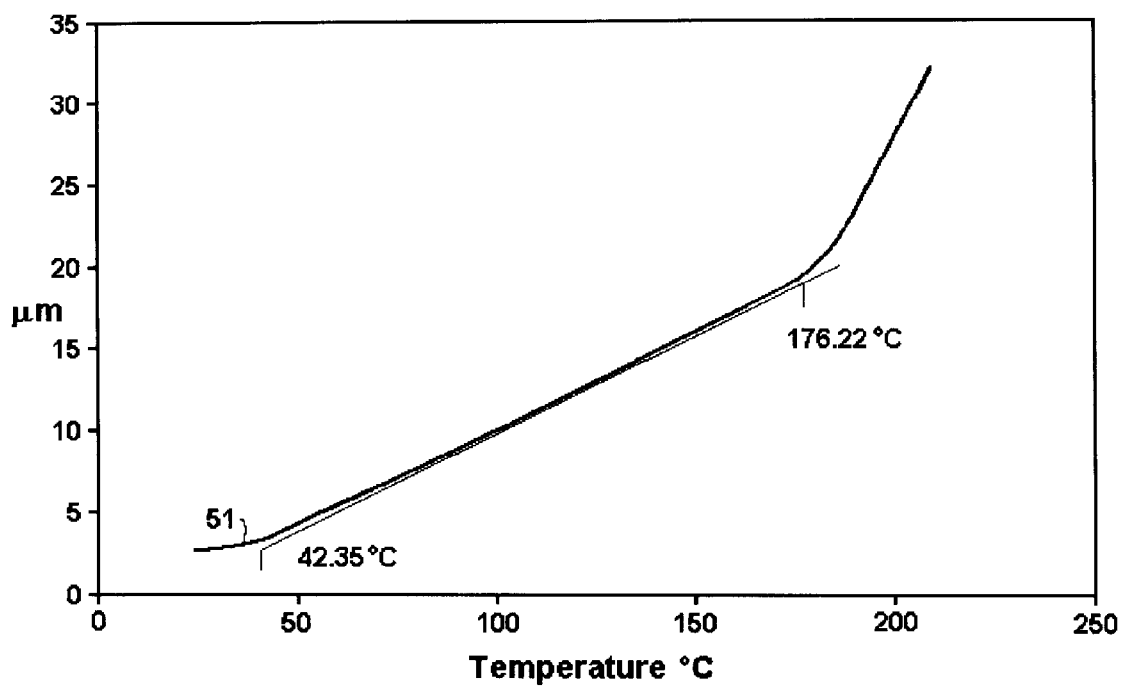

As mentioned above, the coefficient of thermal expansion of the overclad material should essentially match that of the fluoride preform to allow compatibility in drawing, and prevent mechanical strains from developing in the glass over time while in use. To demonstrate the ability to match the expansion properties the coefficients for the overclad glass of samples 6, 8 and 10 were measured and the results are plotted in FIGS. 3–5. The figures plot change in dimension, in $\mu m$, vs. temperature, over the range indicated. The samples were ramped at 10° C. per minute to a temperature of 210° C. In FIG. 3, the results show a dimensional change of 23.7 $\mu m$ over a temperature range a of 162.15° C. The sample length was 7.1980 mm thus yielding a thermal expansion coefficient $\alpha=20.3$ $\mu m/m°$ C. For sample 8, the results given in FIG. 4 show a dimensional change of 16.6 $\mu m$ over a temperature range of 121° C. The sample length was 7.2480 mm giving an $\alpha=18.9$ $\mu m/m°$ C. For sample 10, the data of FIG. 5 shows a dimensional change of 15.3 $\mu m$ over a temperature range of 133.9° C., giving an $\alpha$ equal to 15.8 $\mu m/m°$ C.

Thus the range of expansion coefficients that was demonstrated using the compositions of the invention is 15.8–20.3 $\mu m/m°$ C.

Figure 6:
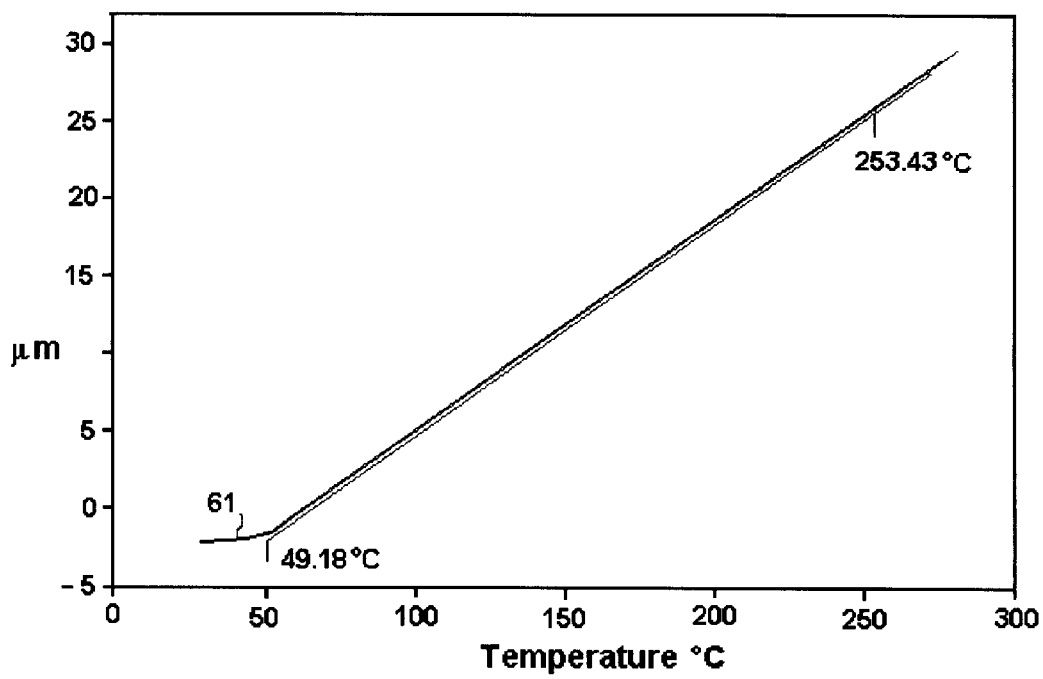
FIGS. 6 and 7 are plots similar to those of FIGS. 3–5 showing the thermal expansion characteristics of two sample fluoride glass compositions.
Figure 7:
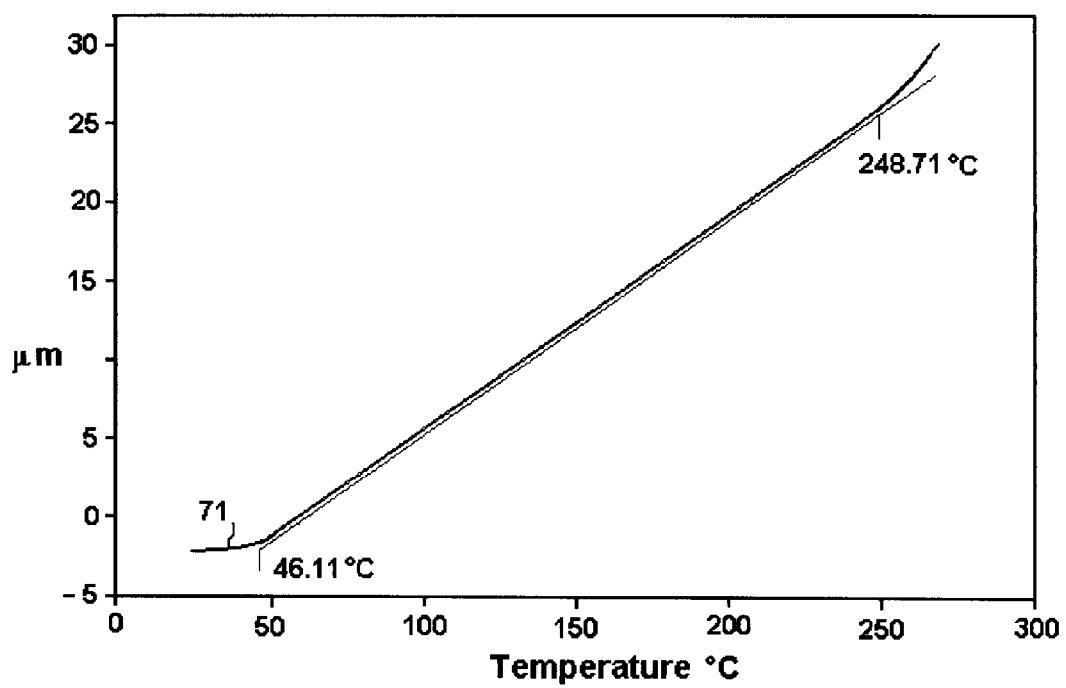

For comparison, the thermal expansion coefficients of ZBLAN glass samples was measured and the results are given by FIGS. 6 and 7. These plots are similar to those of FIGS. 3–5 and the data was obtained using the same analytical method except that the samples were ramped to 260° C. FIG. 6 gives data for a composition: $55HfF_4$-$16BaF_2$-$3LaF_3$-$2.5AlF_3$-$22NaF$. The data shows a dimensional change of 28.8 $\mu m$ over a temperature range of 204.45° C. The sample length was 7.1780 mm giving an $\alpha=19.6$ $\mu m/m°$ C. The data given in FIG. 7 is for a fluoride glass sample with composition: $20HfF_4$-$33ZrF_4$-$18BaF_2$-$4LaF_3$-$3AlF_3$-$22NaF$. A dimensional change of 26.9 $\mu m$ over a temperature range of 121° C. was measured on a 7.1430 mm sample giving an $\alpha 18.6$ $\mu m/m°$ C. As evident, the thermal expansion coefficients for the phosphate glass overclad materials of the invention span the thermal expansion coefficients for the ZBLAN fluoride glasses. The fluoride glass composition measured for the data of FIG. 7 has an expansion coefficient of 18.6 $\mu m/m°$ C. which essentially matches the 18.9 $\mu m/m°$ C. $\alpha$ of sample 8 (FIG. 4). Precise matching can be achieved e.g. by adjusting the $Na_2O$ content of the phosphate glass.

The overclad preform, prepared in the manner described above, is then drawn into an optical fiber by heating the preform to the softening point of the preform glass and then drawing an elongated fiber in the conventional manner. The drawn fiber is coated with a standard polymer optical fiber coating by passing the drawn fiber through a reservoir of coating material, e.g. an epoxy acrylate prepolymer, and curing the prepolymer, typically by exposure to ultraviolet radiation. Conventional and well developed techniques can be used for the drawing operation and the coating step. The draw temperature is generally in the vicinity of the crossover point in the viscosity vs. temperature plot for the preform material and the overcladding material, e.g. $T_D$ in FIG. 1.

The advantage of using an overcladding glass with the properties described earlier is that the dipping temperature can be well below, e.g. more than ten ° C., below the draw temperature.

The process of the invention has been described in the context of fluoride glass preforms and phosphate glass coatings. Other preform materials and other coating materials can be produced according to the principles described if the preform viscosity—temperature profile is steep relative to the overcladding viscosity—temperature profile. The slope of the viscosity—temperature profile is a measure of the fragility of the glass. The slopes in the viscosity—temperature profiles are considered relatively steep when the glass transition temperatures of the two materials differ by 30° C. or more. It is also desirable in the process of the invention that the two materials, i.e. preform and overcladding materials, have a crossover point in the temperature vs. viscosity curves that is below $10^{6.0}$ Poise and preferably below $10^{5.5}$ Poise.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A method comprising the steps of drawing an optical fiber from a glass preform, and coating the drawn fiber with an optical fiber coating, wherein the improvement comprises overcladding the glass preform with a phosphate glass having a glass transition temperature below 200° C. and at least 30° C. below the glass transition temperature of said glass preform by dipping said glass preform into a phosphate glass melt, the phosphate glass melt having a temperature at which the viscosity of the phosphate glass in the phosphate glass melt is less than the viscosity of the glass in the glass preform.

2. The method of claim 1 in which the preform glass is a fluoride glass.

3. The method of claim 2 in which the fluoride glass is a ZBLAN or ZHBLAN glass.

4. The method of claim 1 in which curves relating viscosity and temperature for the preform glass and the phosphate glass cross one another at a crossover point and the crossover point is below $10^6$ Poise.

5. The method of claim 3 in which the fluoride glass comprises $BaF_2$, $LaF_3$, $AlF_3$ NaF and a fluoride selected from the group consisting of $HfF_4$ and $Zr F_4$.

6. The method of claim 5 in which the phosphate glass is prepared from a melt comprising in mol percent, 60–70% $H_3PO_4$, 8–30% PbO, 6–30% of an oxide selected from the group consisting of $Na_2O$, $K_2O$ and mixtures thereof, 0.5–3.0% MgO, 0.5–3.0% BaO, 0.5–3.0% $V_2O_5$ and 0–3.0% CaO.

7. A method for the manufacture of fluoride glass optical fibers comprising the following steps:

a. preparing a fluoride glass preform comprising the following composition:
   50–60% of a fluoride selected from the group consisting of zirconium fluoride, hafnium fluoride and mixtures thereof
   10–25% barium fluoride
   3–7% lanthanum fluoride
   2–5% aluminum fluoride and
   5–25% sodium fluoride b. preparing a phosphate glass melt comprising:
   60–70% $H_3PO_4$,
   8–30% PbO,
   6–30% of an oxide selected from the group consisting of $Na_2O$, $K_2O$ and mixtures thereof,
   0.5–3.0% MgO,
   0.5–3.0% BaO,
   0.5–3.0% $V_2O_5$ and,
   0–3.0% CaO c. heating the phosphate glass melt to a temperature in the range 300°–350° C.

d. heating the preform to a temperature in the range 215°–255° C., e. dipping the heated fluoride glass preform into the phosphate glass melt to overclad the fluoride glass preform with a coating of the phosphate glass, and f. drawing the preform into a fiber.

8. The method of claim 7 wherein the fluoride glass preform is maintained below 335° C. throughout step e.

9. A method comprising dipping an optical fiber preform with a first glass composition into glass melt of a second glass composition said melt having a temperature at which the viscosity of the first glass composition is at least 1.5 times the viscosity of the second glass composition, and the glass transition temperature of said second glass composition is below 200° C. and at least 60° C. below the glass transition temperature of said first glass composition, thereby producing a clad optical fiber preform, drawing a glass optical fiber from said clad optical fiber preform, and coating said optical fiber with an optical fiber polymer coating.

* * * * *